S: SULFOSUCCINATE TYPE ANIONIC SURFACE ACTIVE AGENT

N: NONIONIC SURFACE ACTIVE AGENT HAVING H.L.B. VALUE OF 6-16

T: COMPOUND REPRESENTED BY THE FORMULA (II)

United States Patent Office 3,826,768
Patented July 30, 1974

---

3,826,768
PROCESS FOR PREPARING POLYURETHANE COMPOSITIONS
Isamu Suzuki, Yasuji Nakahara, Kiyoshi Ichikawa, and Kaoru Osonoi, Fuji, Japan, assignors to Asahi Kasei Kogyo Kabushiki Kaisha, Osaka, Japan
Continuation-in-part of abandoned application Ser. No. 872,835, Oct. 31, 1969. This application July 11, 1972, Ser. No. 270,731
Claims priority, application Japan, Nov. 8, 1968, 43/81,274; Mar. 19, 1969, 44/20,399
Int. Cl. C08g 22/14, 51/24
U.S. Cl. 260—29.2 TN    3 Claims

ABSTRACT OF THE DISCLOSURE

Process for preparing polyurethane compositions by dispersing a polyurethane containing isocyanate groups made from polyols and an excessive molar amount of organic isocyanates in water in an amount of at least half the amount of the polyurethane in the absence or presence of a water-soluble compound containing at least two primary or secondary amino groups per molecule, the said polyols containing a polyethylene ether moiety of a molecular weight from 600 to 2,500 in a weight ratio of the polyethylene ether moiety in the polyols represented by the equation (I) from 7.2–9 log $P/1000$ to $100P/(500+P)$ (percent by weight) wherein P is the molecular weight of a polyethylene ether moiety, said polyol being a member selected from the group consisting of (a) a copolymeric polyol consisting of one polyethylene ether block and another block selected from the residues derived from the group consisting of polyesters, polyethers, polyester amides, polyester urethanes, polyether esters, polythioethers and polyhydrocarbon glycols, said polyethylene ether block having a molecular weight of 600 to 2,500 and said residue having a molecular weight of 500 to 5,000, (b) a mixture of a copolymeric polyol under item (a) and another polyol selected from the group consisting of polyesters, polyethers, polyester amides, polyester urethanes, polyether esters, polythioethers and polyhydrocarbon glycols, said polyol having a molecular weight of 500 to 5,000, and (c) a mixture wherein a member selected from the group consisting of polyesters, polyethers, polyester amides, polyester urethanes, polyether esters, polythioethers and polyhydrocarbon glycols having a molecular weight of 500 to 5,000 and a polyethylene glycol having a molecular weight of 600 to 2,500 are contained in a ratio represented by the equation [I], and the dispersion being carried out in the presence of a combination of a sulfosuccinate type anionic surface active agent (S), a nonionic surface active agent having an H.L.B. value from 6 to 16 and being selected from the group consisting of a polyoxyethylene alkyl ether, a polyoxyethylene alkylphenol ether, a polyethylene glycol ether from higher alcohol and a fatty acid ester of polyethylene glycol, and a compound (T) represented by the formula wherein X is a n-valent organic radical having a molecular weight from 500 to 5,000, said compound (T) being obtained by reacting a sultone with a low molecular polyol and treating the resulting addition product with alkali, Y is a monovalent alkali metal, $m$ is an integer from 2 to 4 and $n$ is an integer from 1 to 4, said compounds S, N and T being in a weight ratio within the limits encompassed by the line successively connecting the points A (S=80, N=20, T=0)
B (S=85, N=5, T=10)
C (S=45, N=35, T=20)
D (S=40, N=50, T=10) and
E (S=55, N=45, T=0)

on the triangular coordinates (represented by percent by weight) of FIG. 2.

RELATED APPLICATION

This application is a continuation-in-part of application Ser. No. 872,835, filed Oct. 31, 1969, which has been abandoned.

BACKGROUND OF THE INVENTION

1. Field of the Invention

This invention relates to a process for preparing polyurethane compositions having excellent mechanical and chemical properties. More particularly, it is concerned with high molecular weight polyurethanes capable of forming a stable emulsion by dispersing the polyurethanes in water and a process for preparing the same.

The process of the present invention comprises, in the process in which a low polymeric polyurethane containing isocyanate groups (called prepolymer hereinbelow) made from polyols and an excessive molar amount of organic polyisocyanates is dispersed in water, in an amount at least half the amount of the prepolymer in the absence or presence of a water-soluble compound containing at least two primary or secondary amino groups per molecule, the said polyols containing a polyethylene ether moiety of a molecular weight of from 600 to 2,500 in a weight ratio of the polyethylene ether moiety in the polyols represented by the equation from $$7.2\text{–}9 \log P/1000 \text{ to } 100P/(500+P) \quad [1]$$

(percent by weight) wherein P is the molecular weight of a polyethylene ether moiety, said polyol being a member selected from the group consisting of

Figure 2:
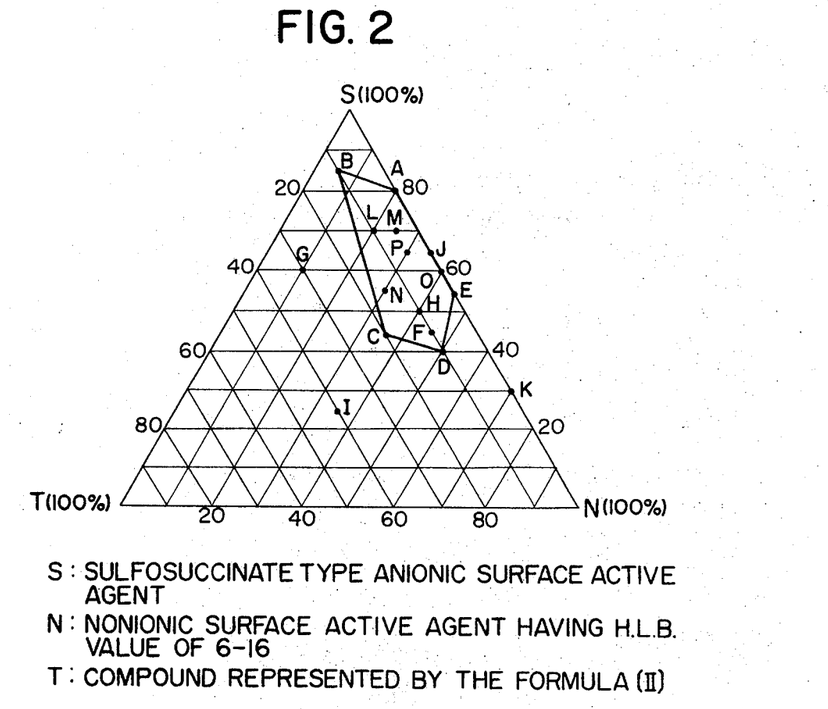

(a) a copolymeric polyol consisting of one polyethylene ether block and another block selected from the residues derived from the group consisting of polyesters, polyethers, polyester amides, polyester urethanes, polyether esters, polythioethers and polyhydrocarbon glycols, said polyethylene ether block having a molecular weight of 600 to 2,500 and said residue having a molecular weight of 500 to 5,000, (b) a mixture of a copolymeric polyol under item (a) and another polyol selected from the group consisting of polyesters, polyethers, polyester amides, polyester urethanes, polyether esters, polythioethers and polyhydrocarbon glycols, said polyol having a molecular weight of 500 to 5,000, and (c) a mixture wherein a member selected from the group consisting of polyesters, polyethers, polyester amides, polyester urethanes, polyether esters, polythioethers and polyhydrocarbon glycols having a molecular weight of 500 to 5,000 and a polyethylene glycol having a molecular weight of 600 to 2,500 are contained in a ratio represented by the equation [I], and the dispersion being carried out in the presence of a combination of a sulfosuccinate type anionic surface active agent (S), a nonionic surface active agent having an H.L.B. value from 6 to 16 and being selected from the group consisting of a polyoxyethylene alkyl ether, a polyoxyethylene alkylphenol ether, a polyethylene glycol ether from higher alcohol and a fatty acid ester of polyethylene glycol, and a compound (T) represented by the formula wherein X is a n-valent organic radical having a molecular weight from 500 to 5,000, said compound (T) being obtained by reacting a sultone with a low molecular polyol and treating the resulting addition product with alkali, Y is a monovalent alkali metal, $m$ is an integer from 2 to 4 and $n$ is an integer from 1 to 4, said compounds S, N and T being in a weight ratio within the limits encompassed by the line successively connecting the points A, B, C, D and E on FIG. 2.

Figure 1:
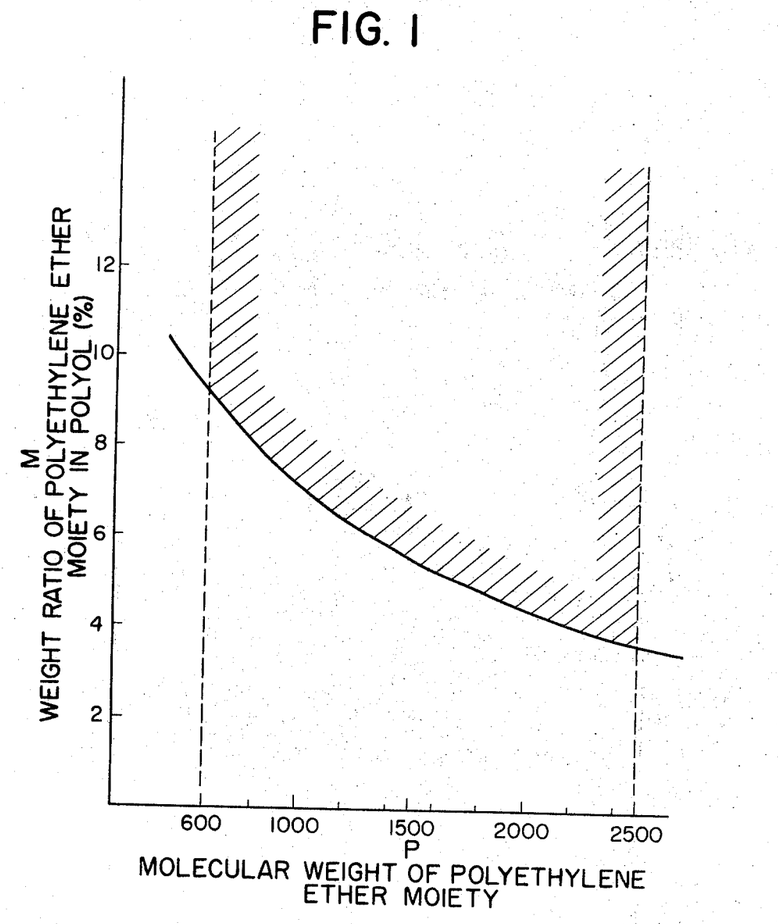

The weight ratio of the polyethylene ether moiety defined by the equation [I] is within the limits indicated by oblique lines of FIG. 1.

2. Description of the Prior Art

Elastic polyurethanes are very complicated in structure and hydrophobic, because they are usually composed of soft segments consisting of polyesters or polyethers with relatively low melting points and hard segments containing urethane or urea groups introduced from organic polyisocyanates. Consequently, formation of the stable emulsion of polyurethanes, in general, was unsatisfactorily attained only with heretofore employed surface active agents. According to another prior technique, polyurethanes which are capable of forming the aqueous emulsion were produced by introducing salt-like groups into the molecular structure. However, due to limitation of the molecular structure, the emulsions of polyurethane having satisfactory mechanical properties have not been provided.

SUMMARY OF THE INVENTION

It is an object of this invention to provide polyurethane compositions with improved properties by overcoming the aforementioned defects. Another object is to provide polyurethane compositions capable of being stably dispersed in water. A further object is to provide aqueous polyurethane emulsions which are applicable to various uses including films, fibers, sheets, a variety of processing agents, adhesives, synthetic leathers and polymer blends.

It is surprising that the emulsions prepared according to this invention tend to exhibit outstanding improvement in stability at low temperatures and mechanical properties as compared with the known emulsions. Moreover, the solid polyurethanes obtained from the former emulsions exhibit a tendency to have relatively low tackiness.

The polyols containing the polyethylene ether moiety include, for example:

(1) Those produced by reacting ethylene oxide with the low polymeric polyols heretofore known such as polyesters, polyethers, polyester amides, polyester urethanes, polyether esters, polythioethers and polyhydrocarbon glycols;

(2) Those produced by condensation reaction of polyethylene glycols as the copolymerizable component in the production of the above-mentioned known low polymeric polyols;

(3) Those produced by mixing the known low polymeric polyols with the polyols as produced under (1) or (2) above;

(4) Those produced by mixing the known polyols with polyethylene glycols; and (5) Those produced by mixing each other two or more of the polyols as produced under (1)–(4) above.

It is necessary that the molecular weight of the polyethylene ether moiety of the polyols produced in such a way as described above is within the scope between 600 and 2,500. If the molecular weight is less than 600, dispersibility of the resulting polyurethane in water will be poor and if more than 2,500, the polyurethane will exhibit a tendency to have inferior mechanical properties.

It is further necessary that the polyethylene ether moiety in the polyols is contained in such a weight ratio as represented by the aforementioned equation [I].

As described above, the maximum content of a polyethylene ether moiety of molecular weight from 600 to 2,500 is restricted to $100P/(500+P)$ weight percent, wherein P is the molecular weight of a polyethylene ether moiety, because the maximum P content can be obtained when the molecular weight of polyol is $(P+500)$. Preferable range of the content of the polyethylene ether moiety is from about 7% by weight to about 35% by weight.

The polyethylene ether moiety contained in ratios less than one represented by the equation [I] will undesirably result in lower stability of the polyurethane emulsion formed or in deterioration in mechanical properties of the final polyurethane. The preferred scope of the molecular weight is within the limits indicated by oblique lines on FIG. 1 which shows the relation between the molecular weight of polyethylene ether moiety and the weight ratio of the same in the polyol. It is preferable that the known low polymeric polyols have a molecular weight from about 500 to 5,000.

As the organic isocyanate are mentioned aromatic polyisocyanates including:

2,4-Tolylenediisocyanate;
2,6-tolylenediisocyanate;
p-phenylenediisocyanate;
4,4'-diphenylmethanediisocyanate;
3,3'-dimethyl-4,4'-diphenylmethanediisocyanate;
4,4'-biphenylenediisocyanate;
1,5-naphthylenediisocyanate;
1-methylbenzene-2,4,6-triisocyanate; and
triphenylmethane-4,4',4''-triisocyanate and aliphatic polyisocyanates including:

Teteramethylenediisocyanate;
hexamethylenediisocyanate;
p-xylylenediisocyanate;
m-xylylenediisocyanate;
methylene-bis-4,4'-cyclohexylisocyanate;
isopropylidene-bis-4,4'-cyclohexylisocyanate; and
cyclohexane-1,4-diisocyanate.

They may be used alone or in combination.

Production of isocyanate-containing prepolymers by the reaction of the polyols containing the polyethylene ether moiety as described above and an excessive molar amount of the organic polyisocyanate is effected by application of conventional methods. The reaction is carried out usually in the absence of any solvent and the ratio of mol number of isocyanate group to hydroxyl group is preferably 1.5 to 2.0. The viscosity of the product is desirably less than 1,000 poises at 30° C. in view of operability in the latter stage of reaction. Although the viscosity varies depending upon the kind of the polyol and organic polyisocyanate used, the degree of excessive molar amount of the organic polyisocyanate and the like, it can be controlled within the desired limits as cited above by making a homogeneous mixture with a solvent when it is above 1,000 poises at 30° C. The solvent may be added during the reaction or it may be used after completion of the reaction to dissolve therein the prepolymer formed. As the preferred solvent are mentioned organic solvents such as benzene, toluene, 1,2-dichloroethane, tetrahydrofuran, dioxane, acetone, ethyl acetate and the like. However, the use of solvent is not a critical factor of the invention.

The prepolymer or a solution thereof thus obtained is dispersed in water in an amount at least half the amount of the prepolymer and, if desired, is further reacted with a water-soluble compound containing at least two primary or secondary amino groups per molecule to obtain the final polymer having a high molecular weight. Preferred examples of the water-soluble amino compound which may be used are inorganic polyamines such as hydrazine, organic aliphatic amines such as:

Ethylenediamine;
1,2-propylenediamine;
1,3-propylenediamine;
1,6-hexamethylenediamine;
1,9-nonamethylenediamine;
1,3- or 1,4-cyclohexanediamine;
m-xylylenediamine;
p-xylylenediamine;
hexahydro-m-xylylenediamine;
hydroquinone-bis-(ω-aminopropyl)-ether;
piperazine;
piperazine-N,N'-bis-(β-ethylamine);
1,4-diaminopiperazine;
diethylenetriamine; and
bis-(aminoxy)-butane and, in addition to the above, oligopolyamides such as one obtained from oxalic acid and excessive ethylenediamine, oligopolyureas which are the reaction products from an organic polyisocyanate and an aliphatic diamine such as one obtained from hexamethylenediisocyanate and excess ethylenediamine carbohydrazide, diaminobiuret, 4-methyldiaminobiuret, hydrazinecarboxylic dihydrazide and the like. It is used alone or in combination of two or more substances. In some cases, they may be used in the form of the hydrate, carbonate, acetate or the like. It is preferable in any case to use the amino compound having a molecular weight not exceeding 500.

In case where an aromatic polyamine such as p-phenylenediamine or 2,4-tolylenediamine is employed, the final polyurethane composition undersirably has a tendency to be susceptible to coloring and reduced in resistance to light.

When a water soluble amino compound and the prepolymer are reacted in water, the latter will be selectively reacted with the water soluble amino compound due to much higher reactivity of the isocyanate group with amino compounds than with water even if both are present in the same reaction system. The amount of the amino compound, when reacted, may not necessarily be specified to be equivalent for the prepolymer but it may be more or less than the equivalent amount. However, as use of the water soluble amino compound in excess of the molar amount is undesirable from the economical point of view, it is preferable to use it in an approximately equivalent or lesser amount.

In subjecting the prepolymer or a solution thereof to dispersion, an aqueous solution of the amino compound may usually be added, while keeping stirring to the dispersion of the prepolymer in water previously prepared, but the addition may be carried out vice versa. Dispersion may also be prepared by adding the prepolymer to a stirred aqueous solution of the amino compound. It is necessary for the preparation of dispersion to use a combination of a sulfosuccinate type anionic surface active agent (S), a nonionic surface active agent (N) having an H.L.B. value from 6 to 16 and a compound (T) represented by the above-cited formula [II] in a weight percent within the limits encompassed by the line successively connecting the points A, B, C, D, and E on FIG. 2 which shows the weight ratios of surface active agents used in the present invention.

As the sulfosuccinate type anionic surface active agent (S), there may be used those of known monoester, diester and diamine series and the like. For example, the sulfosuccinates consisting of the alkyl esters such as the dibutyl, diisobutyl, diamyl, dihexyl and octyl esters are particularly preferable.

As the nonionic surface active agent (N), there may be used those having an H.L.B. value from 6 to 16, selected from a polyoxyethylene alkyl ether, a polyoxyethylene alkylphenol ether, a polyethylene glycol ether from higher alcohol and a fatty acid ester of polyethylene glycol. Use of the nonionic surface active agent with an H.L.B. value less than 6 or more than 16 will lead not only to formation of unstable emulsions but also to remarkable deterioration in molding properties of the solid polyurethanes produced by aggregation from the resulting emulsion.

The H.L.B. value referred to herein is a value representing one fifth of the weight percent of the hydrophilic moiety of a surface active agent. This means that the larger the H.L.B. value the higher is hydrophilicity of the surface active agent.

The compounds represented by the formula [II] may be produced easily by reacting an alkali with the compounds formed by addition of sultones to the known low polymeric polyols as set forth above. They are usually a viscous liquid or a wax-like solid around room temperature.

Any of the three surface active agents described above alone is not sufficiently capable of forming a stable emulsion of the polyurethane. On the other hand, use of a combination of the three having a composition within the limits encompassed by the line connecting the points A (S=80%, N=20%, T=0%), B (S=85%, N=5%, T=10%), C (S=45%, N=35%, T=20%), D (S=40%, N=50%, T=10%) and E (S=55%, N=45%, T=0%) on FIG. 2, enables production of the emulsions with excellent stability on standing as well as improved mechanical and low temperature stabilities. It is preferable to use a total amount of the three surface active agents up to 12% by weight of the prepolymer. The above-mentioned surface active agents (S, N and T) are preferably used in a homogeneous mixture either in the propolymer or the aqueous phase depending upon the affinity.

The amount of water employed for dispersion of the prepolymer or reaction with the water soluble amino compound may be varied to a wide extent. However, the use of an extremely small amount will result in insufficient dispersion, possibly with failure in the desired final polyurethane composition and that of an extremely large amount will provide too dilute a dispersion system to be handled with ease. Therefore, it is preferable to use water in an amount from one half to 50 times the amount of the prepolymer. Dispersing procedure is preferably carried out at temperatures of 60° C. or below.

The polyurethane emulsions thus obtained may be mixed with other emulsions such as, for example, polyvinyl chloride, polyvinylidene chloride, polystyrene, polybutadiene, polyvinyl acetate emulsion or usual copolymer emulsion. In addition, the emulsions of the present invention may be incorporated with any suitable fillers such as carbon black, titanium oxide, silica, glass fibers, calcium carbonate or talc, extenders, pigments and various stabilizers.

The polyurethane emulsions prepared according to the present invention may have wide areas of valuable use. For example, solid polyurethanes obtained by aggregation from the emulsion, alone or in combination with another thermoplastic resin, may be suitably formed and fabricated to desired products by means of, for example, compression molding, extrusion, injection molding or blend calendering. From the emulsions may be obtained impregnated products, films, filaments, synthetic leathers and other products. Moreover, the emulsions prepared according to this invention are suitable for coating fabrics and knits, leathers, papers, woods, metals and the like, for adhesives and wrinkle-resisting finishes, for blenders of concerte and mortar, for plasticizers and for blending agents for polymers.

DESCRIPTION OF PREFERRED EMBODIMENTS

The following examples will serve to illustrate the present invention:

Example 1

A mixture of 90.0 g. of polycaprolactone glycol with an average molecular weight of 1250, 10.5 g. of polyethylene glycol with an average molecular weight of 1000 and 32.0 g. of 4,4'-diphenylmethane diisocyanate were reacted by stirring under nitrogen at 95° C. for 90 min. to produce a prepolymer containing an isocyanate group. Its viscosity at 30° C. was 310 poises.

In this reaction, the mol number of NCO group is 2×32/250, since 32.0 g. of 4,4'-diphenylmethane diisocyanate having a molecular weight of 250 and each one radical at both ends are added, and on the other hand, the mol number of OH group is $$[(2\times 90/1250)+(2\times 10.5/1000)],$$

since 90.0 g. of polycaprolactone glycol having an average molecular weight of 1250, and 10.5 g. of polyethylene glycol with an average molecular weight of 1000 and each one OH radical at both ends are added, respectively. Therefore, the ratio of isocyanate group to hydroxy group is calculated as follows:

$$\frac{2\times 32/250}{(2\times 90/1250)+(2\times 10.5/1000)} \fallingdotseq 1.5$$

The amount of a polyethylene ether moiety of molecular weight from 600 to 2,500 used in this example is calculated as 10.4% by weight based on the total weight of polyol used.

Separately, a solution of 3.6 g. of Neocol SW (S) (Trade name of a sulfosuccinate type anionic surface active agent manufacture by Daiichi Kogyo Seiyaku Co., Ltd.), 3.6 g. of Nonipol 70 (N) (Trade name of a polyoxyethylene nonylphenol ether type of nonionic surface active agent, H.L.B. value 11.7) and 0.8 g. of compound A of the above formula [II] (T) (produced as described below) dissolved in 200 g. of water (the component

S:N:T=45:45:10 corresponding to the point F on FIG. 2) was prepared, to which was then added with stirring the above-mentioned prepolymer over a period of 3 min.

The resulting emulsion remained unchanged on standing at room temperature for 6 months. The test on stability at low temperatures of the emulsion according to the method JIS K–5663–1956 indicated no deterioration following five freezings at —10 to —12° C. continuously repeated. The emulsion was observed to be stable on agitating at a high speed of 10,000 r.p.m. for 2 hours at 30° C. using an M-type homogenizer manufactured by Tokushu Kikai Kogyo Co., Ltd.

The above-mentioned compound A of the formula [II] was produced by reacting 96 g. of polycaprolactone glycol with an average molecular weight of 1200 and 19.5 g. of propanesultone in 110 g. of tetrahydrofuran at 50° C. for 2 hours, neutralizing the reaction mixture with an aqueous solution of sodium hydroxide and removing a larger portion of the tetrahydrofuran and water by distillation under reduced pressure and was wax-like at room temperature.

As a comprative example, the procedures of the above example were repeated with S, N and T in a ratio corresponding to the point G, a point beyond the limits encompassed by the line connecting the points A, B, C, D and E (S:N:T=60:10:30). Although the stability on standing of the emulsion was fair, the low temperature stability was poor in view of aggregation of the polymer just after the first freezing in the aforementioned test. The high speed agitation under the same conditions as stated above resulted in aggregation of portion of the polymer to indicate poor mechanical stability.

The emulsion obtained in the present example was poured over a glass plate and dried at room temperature for 16 hours and subsequently at 120° C. for 30 min. There was obtained an elastic film with the following mechanical properties:

Tensile strength, 325 kg./cm.$^2$;
Elongation, 780%.

The elastic film was colorless and transparent and has a glaze superior to that of the films produced by the prior polyurethane emulsions.

Example 2

A prepolymer was produced by reacting with stirring 120 g. of polycaprolactone glycol with an average molecular weight of 1200, 24 g. of polyethylene glycol with an average molecular weight of 1000 and 32 g. of a mixture containing 80% of 2,4-tolylenediisocyanate and 20% of 2,6-tolylenediisocyanate under nitrogen at 60° C. for 16 hours.

The ratio of isocyanate group to hydroxyl group contained in the starting material used for preparing said prepolymer is calculated as follows in a similar manner as in Example 1:

$$\frac{2\times 32/174}{(2\times 120/1200)+(2\times 24/1000)} \fallingdotseq 1.5$$

The amount of a polyethylene ether moiety of molecular weight from 600 to 2,500 used in this example is calculated as 16.7% by weight based on the total weight of polyol used.

The prepolymer was mixed with 4.5 g. of Pelex OT-P (S) (Trade name of a sulfosuccinic diester type anionio surface active agent manufactured by Kao Atlas Co., Ltd.) and 3.6 g. of Nonipol 70 (N) used in Example 1 and the mixture was maintained under stirring at 5° C. To an aqueous solution of 0.90 g. of compound A used in Example 1 (T) in 300 g. of water which was stirred at 5° C. was added the above-stated prepolymer over a period of 3 min. To the resulting emulsion, while keeping stirring, was rapidly added an aqueous solution of 3.7 g. of ethylenediamine in 100 g. of water at 5° C. to complete the reaction. (S:N:T in this case was 50:40:10 which corresponded to the point H on FIG. 2.)

The emulsion thus obtained exhibited no deterioration on standing at room temperature for 4 months. The same low temperature stability test as in Example 1 was carried out with this emulsion to exhibit no deterioration after four times of repeated freezings. The stability of the emulsion was not destroyed by the same test as in Example 1 using a homogenizer.

The film produced from the above emulsion by the same procedures as in Example 1 had the following properties:

Tensile strength, 351 kg./cm.$^2$;
Elongation, 650%.

As a comparative example, the same procedures as in the above example were repeated using a ratio of S:N:T corresponding to the point I on FIG. 2

(S:N:T=25:35:40)

Although the stability on standing of the resulting emulsion was fair, the low temperature stability was poor in view of aggregation of the polymer just after the first freezing. The high speed agitation under the same conditions as above resulted in precipitation of the polymer to indicate poor mechanical stability.

Example 3

A prepolymer was produced in the same way as in Example 1 from 24.0 g. of 4,4'-diphenylmethanediisocyanate and 120 g. of a copolymerized diol with an average molecular weight of 2500 which was prepared by addition polymerization of polyethylene glycol with an average molecular weight of 800 with ϵ-caprolactone. It had a viscosity of 255 poises at 30° C.

The ratio of isocyanate group to hydroxyl group contained in the starting material used for preparing said prepolymer is calculated as follows in a similar manner as in Example 1:

$$\frac{2\times 24/250}{2\times 120/2500}=2.0$$

The amount of a polyethylene ether moiety of molecular weight from 600 to 2,500 used in this example is calculated as 32.0% by weight based on the total weight of polyol used.

To a stirred solution of 3.9 g. of Pelex OT-P used in Example 2 and 2.1 g. of Nonipol 70 used in Example 1 in 300 g. of water (S:N:T=65:35:0 corresponding to the point J on FIG. 2) was added the above prepolymer at 45° C.

The emulsion thus prepared underwent no deterioration on standing at room temperature for 6 months. In the low temperature stability test it was resistant to five times of repeated freezings.

As a comparative example, the procedures of the above example were repeated using a varied ratio of S, N and T corresponding to the point K on FIG. 2

(S:N:T=30:70:0)

The stability of the resulting emulsion was not sufficient so that on standing for about a week aggregates of the polyurethane were observed.

To the emulsion prepared in the present example was added saturated aqueous sodium chloride to form aggregated granular polyurethane, which was, after being washed with water and dried, compression molded at a temperature of 180° C. and a pressure of 120 kg./cm.$^2$. Sheets with no foam were obtained which had the following properties and were very easily releasable from the metal mold:

Tensile strength, 280 kg./cm.$^2$;
Elongation, 900%;
Shore A hardness, 84.

Example 4

A prepolymer was produced in the same way as in Example 1 from 250 g. of the copolymerized diol with an average molecular weight of 2500 obtained in Example 3 and 37.5 g. of 4,4'-diphenylmethanediisocyanate.

The ratio of isocyanate group to hydroxyl group contained in the starting material used for preparing said prepolymer is calculated as follows in a similar manner as in Example 1:

$$\frac{2 \times 37.5/250}{2 \times 250/2500} = 1.5$$

The amount of a polyethylene ether moiety of molecular weight from 600 to 2,500 used in this example is calculated as 32.0% by weight based on the total weight of polyol used.

In place of the Pelex OT-P in Example 3 were employed 22.4 g. of Neocol SW (stated in Example 1) (S) together with 6.4 g. of Emulmin 40 (N) (trade name of a higher alcohol ether of polyethylene glycol, nonionic surface active agent manufactured by Sanyo Kasei Kogyo Co., Ltd., with an H.L.B. value of 8.0), added with stirring to the prepolymer.

The above prepared prepolymer was then added to a stirred aqueous solution containing 400 g. of water, 4.3 g. of dried piperazine and 3.2 g. of the compound A (T) used in Example 1 (S:N:T=70:20:10 corresponding to the point L on FIG. 2).

The resulting emulsion was allowed to stand at room temperature without any substantial deterioration and was resistant to repeated freezings. The film produced in this example was low in tackiness and exhibited the following properties:

Tensile strength, 300 kg./cm.$^2$;
Elongation, 960%.

As a comparative example, the ratio of S, N and T was varied to S:N:T=60:10:30 corresponding to the point G on FIG. 2. The resulting emulsion was insufficiently stable, precipitating aggregates of the polyurethane on standing at room temperature for about a week.

Example 5

A prepolymer was obtained composed of a mixture of 138.0 g. of polytetramethylene ether glycol with an average molecular weight of 1380 and 15.0 g. of polyethylene glycol with an average molecular weight of 1200, and 35.2 g. of 2,4-tolylenediisocyanate. The viscosity of the prepolymer at 30° C. was 185 poises.

The ratio of isocyanate group to hydroxyl group contained in the starting material used for preparing said prepolymer is calculated as follows in a similar manner as in Example 1:

$$\frac{2 \times 35.2/174}{(2 \times 138/1380) + (2 \times 15/1200)} \doteq 1.8$$

The amount of a polyethylene ether moiety of molecular weight from 600 to 2,500 used in this example is calculated as 9.8% by weight based on the total weight of polyol used.

Using 7.0 g. of sodium salt of sulfosuccinic dioctylester (S), 2.5 g. of Emulmin 40 (N) used in Example 4 and 0.5 g. of the compound B represented by the formula [II] (T) (stated below) was prepared an emulsion in the same way as in Example 1 (S:N:T=70:25:5 corresponding to the point M on FIG. 2).

The elastic film prepared from the above emulsion in the same way as in Example 1 had the following properties:

Tensile strength, 340 kg./cm.$^2$;
Elongation, 675%.

The above-cited compound B of the formula [II] was prepared in the same way as with the compound A in Example 1 from 116 g. of polytetramethylene ether glycol and 19.5 g. of propanesultone and was a wax-like solid at room temperature.

Example 6

A prepolymer was obtained composed of a mixture of 100 g. of polyethylene adipate with an average molecular weight of 1250 and 12 g. of polyethylene glycol with an average molecular weight of 1500, and 44 g. of 4,4'-diphenylmethanediisocyanate.

The ratio of isocyanate group to hydroxyl group contained in the starting material used for preparing said prepolymer is calculated as follows in a similar manner as in Example 1:

$$\frac{2 \times 44/250}{(2 \times 100/1250) + (2 \times 12/1500)} = 2.0$$

The amount of a polyethylene ether moiety of molecular weight from 600 to 2,500 used in this example is calculated as 10.7% by weight based on the total weight of polyol used.

The prepolymer was treated in the same way as in Example 1 using 4.4 g. of Pelex OT-P (S) used in Example 2, 2.4 g. of Emulmin 40 (N) used in Example 4, 1.2 g. of the compound B of the formula [II] (T) used in Example 5 and 280 g. of water to form an emulsion (S:N:T=55:30:15 corresponding to the point N on FIG. 2).

Powdery polyurethane was obtained from the emulsion thus produced in the same way as in Example 3, which was molten at 190° C. and extruded through nozzles 0.15 mm. in diameter followed by winding at a spinning velocity of 250 mm./min. The filaments thus obtained had the following properties:

Denier, 270;
Tensile strength, 0.64 g./d.;
Elongation, 720%;
Permanent set, 4.8%.

Example 7

A prepolymer was prepared by reacting a mixture of 150 g. of polyethylene adipate with an average molecular weight of 1500 and 15 g. of polyethylene glycol with an average molecular weight of 1000 with 51.7 g. of 4,4'-diphenylmethanediisocyanate at 90° C. for 1 hour.

The ratio of isocyanate group to hydroxyl group contained in the starting material used for preparing said prepolymer is calculated as follows in a similar manner as in Example 1:

$$\frac{2 \times 51.7/250}{(2 \times 150/1500) + (2 \times 15/1000)} \doteq 1.8$$

The amount of a polyethylene ether moiety of molecular weight from 600 to 2,500 used in this example is calculated as 9.1% by weight based on the total weight of polyol used.

To the prepolymer were added 24.1 g. of toluene and 6.0 g. of Nonipol 70 (N) used in Example 1 and the homogeneous mixture was kept at 20° C. Then, the resulting prepolymer was added at 20° C. over a period of about 3 min. to a stirred solution which contains 9.0 g. of Pelex OT-P (S) used in Example 2 and 9.4 g. of 1,4-cyclohexanediamine in 166 g. of water. (S:N:T=60:40:0 corresponding to the point O on FIG. 2).

The emulsion thus prepared being of a good stability was treated in the same way as in Example 3 to obtain powdery polyurethane, which was formed to a sheet by treatment at a temperature of 130° C. and a pressure of 100 kg./cm.² for 30 min. The sheet possessed the following properties:

Tensile strength, 280 kg./cm.²;
Elongation, 720%;
Shore A hardness, 95.

Example 8

A prepolymer was prepared by reacting a mixture of 200 g. of polyoxytetramethylene glycol with an average molecular weight of 2000, 16 g. of polyethylene glycol with an average molecular weight of 1500 and 29.9 g. of 1,6-hexamethylenediisocyanate.

The ratio of isocyanate group to hydroxyl group contained in the starting material used for preparing said prepolymer is calculated as follows in a similar manner as in Example 1:

$$\frac{2 \times 29.9/168}{(2 \times 200/2000) + (2 \times 16/1500)} \doteq 1.6$$

The amount of a polyethylene ether moiety of molecular weight from 600 to 2,500 used in this example is calculated as 7.4% by weight based on the total weight of polyol used.

To the prepolymer were added 11.7 g. of Pelex OT-P (S) cited above and 0.9 g. of the compound B of the formula [II] (T) used in Example 5 and the mixture was kept at 15° C. The resulting prepolymer was added at 15° C. over a period of 30 min. to a stirred solution containing 351 g. of water, 5.4 g. of Emulmin 40 (N) and 17 g. of oligopolyamide (with an amino equivalent of 172) prepared by reacting adipic acid with excess ethylenediamine to form a stable emulsion (S:N:T=65:30:5 corresponding to the point P on FIG. 2).

A sheet of cotton cloth was dipped in this emulsion, well squeezed and dried at 50° C. for 30 min. The faces with the urethane attached were joined together by heating at 130° C. while compressing at 2 kg./cm.² for 2 min. with a result of soft adhesion which was not releasable.

Comparative Example

The following tests were carried out to prove that the use of a polyol containing a polyethylene ether moiety having a specific molecular weight in a specific ratio and the use of a combination of specific surfactants in specific proportions disclosed and claimed in the present application are critical and result in the product of products which are significantly different from products made outside the scope of the critical features disclosed and claimed in the present application.

Experiment 1

This Experiment, which is outside the scope of the present invention, did not use a polyol containing the polyethylene ether moiety.

The procedures of Example 1 were repeated in this Experiment 1, except that polyethylene glycol was not added. The polyurethane composition which was obtained was kept in a dispersed state on agitating, but started to be precipitated as soon as the agitation was terminated and divided into an upper and a lower layer in several hours. The deposit was left as it was for a whole day and night, and it was found that the polymer of the lower layer exhibited a low stability since it was hardened in a rubbery state.

Experiment 2

This Experiment, which is outside the scope of the present invention, used a polyol containing a polyethylene ether moiety with a molecular weight of less than 600 or containing a polyethylene ether moiety with a molecular weight of more than 2500.

The procedures of Example 1 were repeated, except that polyethylene glycols having molecular weights of 400 and 3000, respectively, were used. The emulsions obtained are respectively called emulsion A and emulsion B. The properties of these emulsions A and B are compared with those of the emulsion obtained in Example 1 in the following table.

| | Emulsion | | |
|---|---|---|---|
| | Obtained in Example 1 | A | B |
| Storage stability at room temperature. | 6 months | 2 days | The viscosity increased after 1 week. |
| Low temperature stability JIS K-5663. | Resistant to 5 times freezings. | Precipitated at the first freezing. | The viscosity increased in 3 times freezings. |
| Homogenizer test 10,000 r.p.m. X2 hr. | No precipitation | Precipitation | No precipitation. |
| Appearance of film | Colorless and transparent. | No formation of film | Tacky film inseparable from glass plate. |

As stated above, the emulsion A obtained by using a polyethylene glycol with a molecular weight of 400 shows a poor dispersibility in water. Therefore, it has substantially low value as emulsion and forms no film. And the emulsion B obtained from a polyethylene glycol with a molecular weight of 3000 is in a fair state of emulsification, and yields no deposit in the homogenizer test. But the viscosity of emulsion increases when left as it is or kept at a low temperature. And the film obtained by pouring the emulsion over a glass plate was very tacky and readily broken when efforts were made to separate the film from the glass plate. The viscosity of this emulsion was very high as compared with that of other emulsions, and being very unfavourable to be treated practically.

Experiment 3

The weight ratio of the polyethylene ether moiety of the polyol used in this Experiment 3 is below the limits indicated by oblique lines on FIG. 1. This Experiment 3, therefore, is outside the scope of the present invention.

The procedures of Example 1 were repeated in this Experiment, except that the amount used of a polyethylene glycol with an average molecular weight of 1000 was decreased to 4.7 g. against 90.0 g. of polycaprolactone glycol. That is, the weight ratio of the polyethylene glycol moiety to the polyol in this Experiment 3 is 5%, which is

Experiment 4

This Experiment, which is outside the scope of the present invention, did not use a sulfosuccinate type anionic surface active agent (S).

A prepolymer was produced by reacting with stirring 120 g. of polycaprolactone glycol with an average molecular weight of 1200, 24 g. of polyethylene glycol with an average molecular weight of 1000, and 32 g. of a mixture containing 80% of 2,4-tolylenediisocyanate and 20% of 2,6-tolylenediisocyanate, under nitrogen at 60° C. for 16 hours.

The prepolymer was mixed with 3.6 g. of Nonipol 70 (N) used in Example 1, and the resulting mixture was maintained under stirring at 5° C. To an aqueous solution of 0.90 g. of the compound A used in Example 1 (T) in 300 g. of water which was stirred at 5° C., was added the above-stated prepolymer over a period of 3 min.

Simultaneously with the addition of an aqueous solution of ethylenediamine to the resulting emulsion, the polymer started to be precipitated and finally was completely separated from the layer of water. This phenomenon was little improved even if the amounts of T and N were increased.

Experiment 5

This Experiment, which is outside the scope of the present invention, did not use a nonionic surface active agent (N).

The procedures of Example 1 were repeated except that Nonipol 70 was not used. The emulsion obtained did not yield a deposit on storage for more than 6 months, but the polymer was already precipitated at the first freezing. The polymer was also precipitated with agitation by means of a homogenizer.

Experiment 6

A prepolymer was prepared by reacting a mixture of 150 g. of polyethylene adipate with an average molecular weight of 1500 and 13 g. of polyethylene glycol with an average molecular weight of 1000, with 51.7 g. of 4,4'-diphenylmethanediisocyanate at 90° C. for 1 hour. To the prepolymer were added 24.1 g. of toluene and 6.0 g. of Ionet S-80 (Trade name of sorbitan fatty acid ester type nonionic surface active agent having H.L.B. value 4.3, manufactured by Sanyo Kasei Kogyo Kabushiki Kaisha) or Emulmin L-380 (Trade name of a higher alcohol ether of polyethylene glycol, nonionic surface active agent having H.L.B. value of 17.7, manufactured by Sanyo Kasei Kogyo Kabushiki Kaisha) and the homogeneous mixtures were kept at 20° C. The emulsions obtained are called emulsion A and emulsion B, respectively.

Emulsion A showed the same state of emulsification as that of Experiment 5 in which N was not used completely. A part of the polymer was already precipitated at the first freezing and with agitation by means of a homogenizer.

Though emulsion B was sufficiently stable, the powdered polyurethane obtained therefrom in the same way and molded under the same conditions as in Example 7 adhered tightly to the metal mold and was broken when efforts were made to forcibly release it therefrom.

We claim:

1. Process for preparing polyurethane compositions by dispersing a polyurethane containing isocyanate groups made from polyols and an excessive molar amount of organic isocyanates in water of an amount at least half the amount of the polyurethane in the absence or presence of a water-soluble compound containing at least two primary or secondary amino groups per molecule, said polyurethane having a molar ratio of isocyanate group to hydroxyl group of from 1.5 to 2.0, the said polyols containing a polyethylene ether moiety of a molecular weight from 600 to 2,500 in a weight ratio of the polyethylene ether moiety in the polyols represented by the equation from 7.2–9 log $P/1000$ to $100P/(500+P)$ (percent by weight) wherein P is the molecular weight of a polyethylene ether moiety, said polyols being selected from the group consisting of (a) a copolymeric polyol consisting of one polyethylene ether block and another block selected from the residues derived from the group consisting of polyesters, polyethers, polyester amides, polyester urethanes, polyether esters, polythioethers and polyhydrocarbon glycols, said polyethylene ether block having a molecular weight of 600 to 2,500 and said residues having a molecular weight of 500 to 5,000, (b) a mixture of a copolymeric polyol under item (a) and another polyol selected from the group consisting of polyesters, polyethers, polyester amides, polyester urethanes, polyether esters, polythioethers and polyhydrocarbon glycols, said polyol having a molecular weight of 500 to 5,000, and (c) a mixture wherein a member selected from the group consisting of polyesters, polyethers, polyester amides, polyester urethanes, polyether esters, polythioethers and polyhydrocarbon glycols having a molecular weight of 500 to 5,000 and a polyethylene glycol having a molecular weight of 600 to 2,500 are contained in a ratio represented by the equation [I], and the dispersion being carried out in the presence of a combination of a sulfosuccinate type anionic surface active agent (S), a nonionic surface active agent (N) having an H.L.B. value from 6 to 16 and being selected from the group consisting of a polyoxyethylene alkyl ether, a polyoxyethylene alkylphenol ether, a polyethylene glycol ether from higher alcohol and a fatty acid ester of polyethylene glycol, and a compound (T) represented by the formula wherein X is an n-valent organic radical having a molecular weight from 500 to 5,000, said compound (T) being obtained by reacting a sultone with a low molecular polyol and treating the resulting addition product with alkali, Y is a monovalent alkali metal, $m$ is an integer from 2 to 4 and $n$ is an integer from 1 to 4, said compounds S, N and T being in a weight ratio within the limits encompassed by the line successively connecting the points
A (S=80, N=20, T=0)
B (S=85, N=5, T=10)
C (S=45, N=35, T=20)
D (S=40, N=50, T=10) and
E (S=55, N=45, T=0)
on the triangular coordinates (represented by percent by weight) of FIG. 2.

2. Process of Claim 1, wherein the total amount of S, N and T is up to 12 percent by weight of the polyurethane.

3. Process of Claim 1, wherein the content of the polyethylene ether moiety from a molecular weight from 600 to 2,500 is from about 7% by weight of the total polyol to about 35% by weight.

References Cited

UNITED STATES PATENTS 2,968,575  1/1961  Mallonee _______ 260—29.2 TN
3,281,397  10/1966  Axelrood _______ 260—29.2 TN (Other references on following page)

References Cited

| | | |
|---|---|---|
| 3,210,302 | 10/1965 | Bowell et al. 260—29.2 TN |
| 3,178,310 | 4/1965 | Berger et al. 260—29.2 TN |
| 3,242,230 | 3/1966 | Habib 260—29.2 TN |
| 3,294,724 | 12/1966 | Axelrood 260—29.2 TN |
| 3,361,689 | 1/1968 | Miegel et al. 260—29.2 TN |
| 3,384,606 | 5/1968 | Dieterich et al. 260—29.2 TN |
| 3,401,133 | 9/1968 | Grace et al. 260—29.2 TN |
| 3,410,817 | 11/1968 | McClellan et al. 260—29.2 TN |
| 3,437,624 | 4/1969 | Dawn et al. 260—29.2 TN |

FOREIGN PATENTS

| | | |
|---|---|---|
| 3,438,922 | 4/1969 | Veno et al. 260—29.2 TN |
| 3,438,940 | 4/1969 | Keberle et al. 260—29.2 TN |
| 3,479,310 | 11/1969 | Dieterich et al. 260—29.2 TN |
| 3,491,050 | 1/1970 | Keberle et al. 260—29.2 TN |

MURRAY TILLMAN, Primary Examiner

A. H. KOECKERT, Assistant Examiner

U.S. Cl. X.R.

117—161 KP; 161—181; 260—29.6 NR, 75 NP, 77.5 AN; 264—176 F

UNITED STATES PATENT OFFICE
CERTIFICATE OF CORRECTION

Patent No. 3,826,768                         Dated July 30, 1974

Inventor(s) ISAMU SUZUKI et al

It is certified that error appears in the above-identified patent and that said Letters Patent are hereby corrected as shown below:

Column 6, line 65 - Before "and" (first occurrence), delete "concerte" and replace with ---concrete---.

Column 7, line 58 - Before "example", delete "comprative" and replace with ---comparative---.

Column 11, line 66 - Before "min.", delete "30" and replace with ---3---.

Column 14, line 66, Claim 3 - After "moiety" delete "from" and replace with ---of---.

Signed and sealed this 31st day of December 1974.

(SEAL)
Attest:

McCOY M. GIBSON JR.
Attesting Officer

C. MARSHALL DANN
Commissioner of Patents